Oct. 11, 1932.   E. G. HANKS   1,882,575
EDUCATIONAL DEVICE
Filed Jan. 30, 1930   4 Sheets-Sheet 1
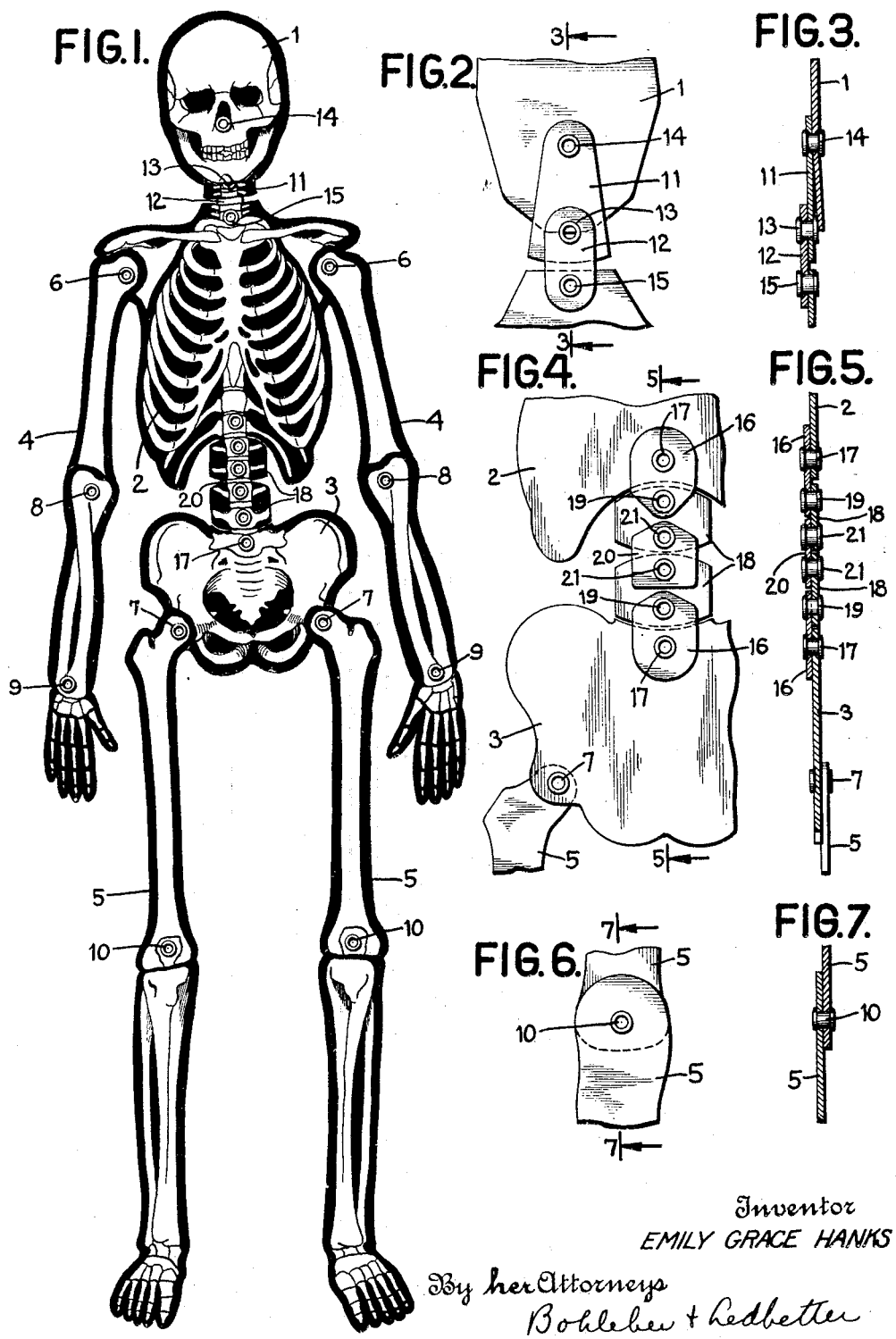
Inventor
EMILY GRACE HANKS
By her Attorneys
Bohleber & Ledbetter

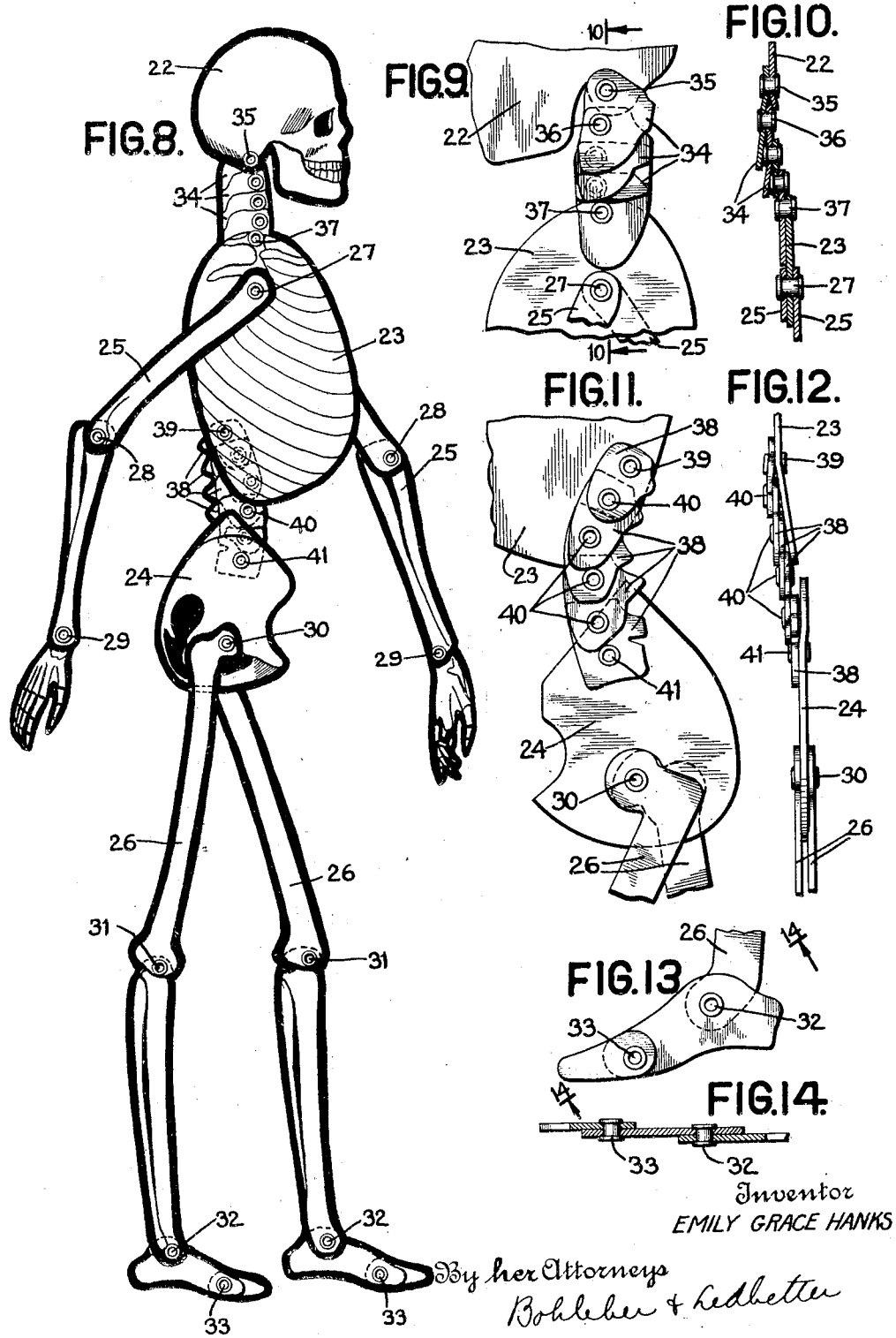

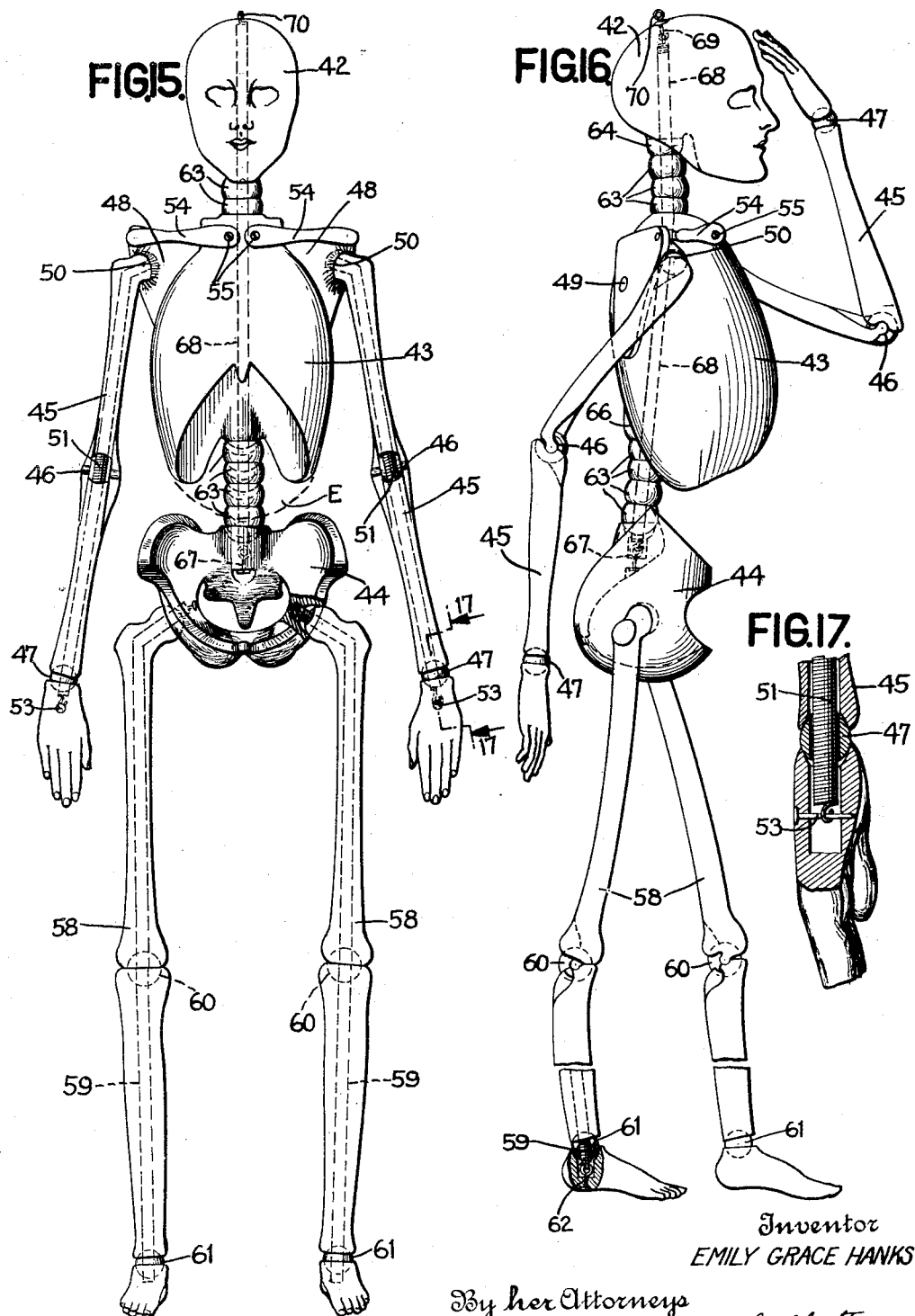

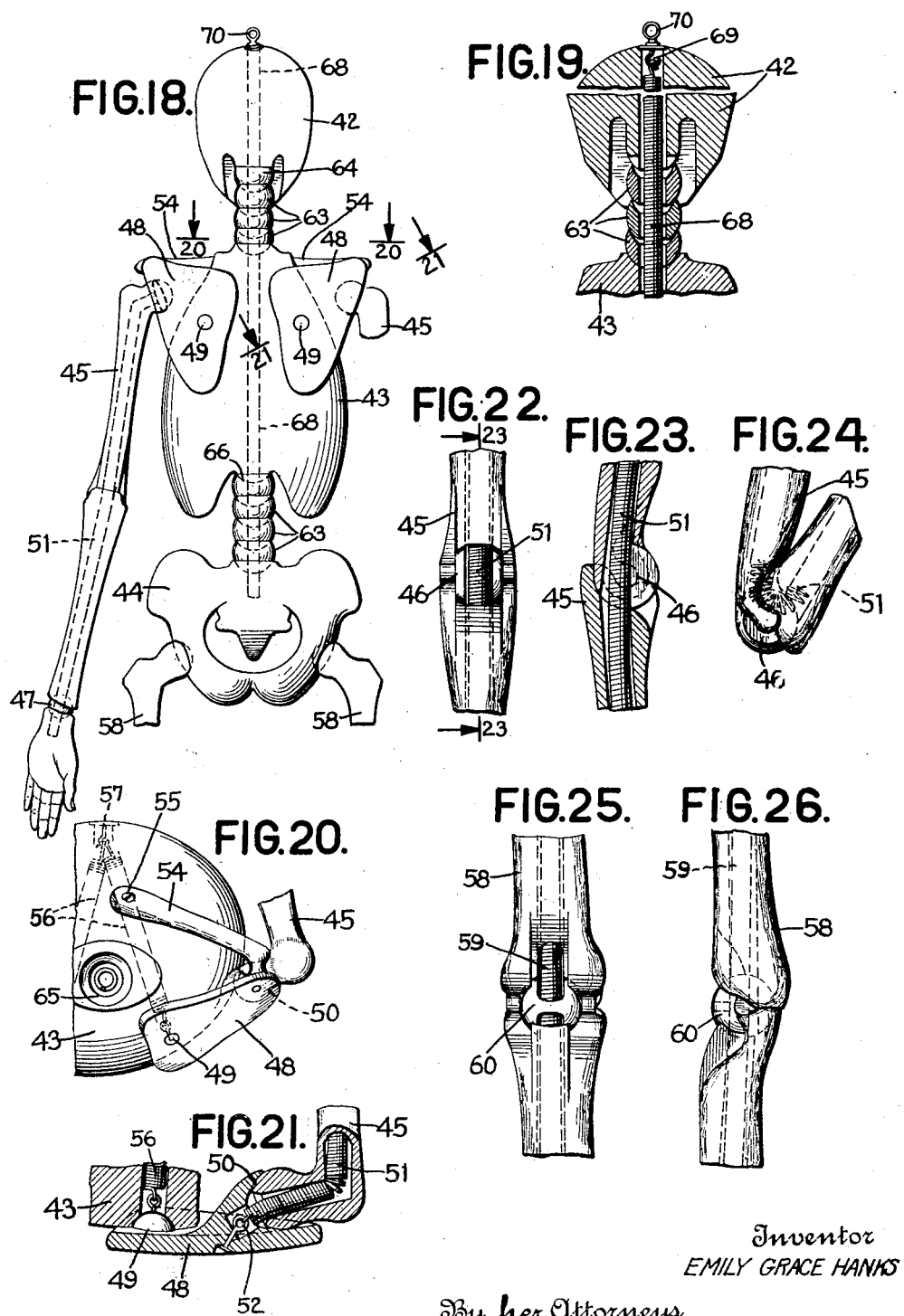

Patented Oct. 11, 1932

1,882,575

UNITED STATES PATENT OFFICE

EMILY GRACE HANKS, OF BROOKLYN, NEW YORK

EDUCATIONAL DEVICE

Application filed January 30, 1930. Serial No. 424,491.

This invention relates to educational devices and more particularly to an educational device wherein the analysis or study of the human being constitutes the subject matter of the desired education.

One object of the invention is to provide an anatomical device for use as an armature for modeling and sculpturing and for use in painting, sketching and other uses as will be apparent from the following description.

Other objects of the invention are to present to a student or others the relationship of the structure of the human body and to enable the study of the same to be made in various atitudes which may be assumed by the human being; to enable a student to make the study of postures from the model of the essential elements of the human structure; to provide an articulation of the model simulating the articulation existent in the human being; to obtain a shoulder and arm movement so as to obtain realistic attitudes of the device; to enable the model to be positioned in any desired attitude and retain that attitude for purpose of study or the like; to carry out the invention in structure of two dimensions as well as in structure of three dimensions; to secure simplicity of construction and operation and to obtain other advantages and results which perusal of the following specification and study of the invention will emphasize.

With these and other objects in view, the invention will be more specifically described and is illustrated in a physical embodiment in the accompanying drawings wherein Figures 1 to 7 inclusive illustrate the invention as applied to a figure of two dimensions considering a human being from a front position, and in these figures Figure 1 is an articulated figure comprising essentially a human skeleton in front elevation;

Figure 2 is a detailed view from the rear of Fig. 1 showing the articulated neck for the device;

Figure 3 is a section view on line 3—3 of Fig. 2;

Figure 4 is a rear view of the articulated spinal column looking at the same from the rear of Fig. 1;

Figure 5 is a sectional view on line 5—5 of Fig. 4;

Figure 6 is a view showing the articulated limb joint such as the joint at the knee of the device, looking at the same from the rear of Fig. 1; and Figure 7 is a sectional view on line 7—7 of Fig. 6.

Figures 8 to 14 are views similarly illustrating the essential elements of a human figure as appears in side view, this device likewise being in two dimensions and articulated for showing various positions of the portions of the body, and in these figures Figure 8 is an elevation of the device showing the human skeleton, in outline, in side view;

Figure 9 is an elevation of the articulation of the neck looking at the same from the rear of Fig. 8;

Figure 10 is a sectional view on line 10—10 of Fig. 9;

Figure 11 is an elevation showing articulation of the spinal column looking at the same from the rear of Fig. 8;

Figure 12 is an edge view of the portion of the device shown in Fig. 11;

Figure 13 is a view showing articulation of the foot looking at the same from the rear of Fig. 8; and Figure 14 is a sectional view on line 14—14 of Fig. 13.

Figures 15 to 26 inclusive show the invention as applied to a device in three dimensions, and in these views Figure 15 is a front view of the device;

Figure 16 is a side view of the same;

Figure 17 is a sectional view of the articulated wrist joint on line 17—17 of Fig. 15;

Figure 18 is a rear view of the device;

Figure 19 is a central sectional view through the head and neck showing the articulated support for the head;

Figure 20 is a top view of the shoulders and transverse section through the neck on line 20—20 of Fig. 18;

Figure 21 is a sectional view showing the articulated shoulder and arm support, the same being taken on line 21—21 of Fig. 18;

Figure 22 is a view in elevation showing the articulated arm joint or elbow;

Figure 23 is a sectional view of the same on line 23—23 of Fig. 22;

Figure 24 is a side elevation showing the elbow bent;

Figure 25 is a view of the leg or knee joint; and

Figure 26 is a side view of the same.

In the study of the human figure and in teaching students the art of sketching, drawing or reproducing the human figure, it is most desirable to obtain an analysis of that figure into simple forms, i. e., well known shapes, and enable those forms to be studied in proper and various relationship. In order that this may be done to best advantage I have devised a construction associating the representations of essential parts of the human body and have maintained that association by articulated connections simulating the corresponding parts of the human body. While jointed figures have heretofore been made for amusement and similar purposes, it is to be expressly understood that my device is for educational purposes and in order to render the same useful in that respect, I provide connections between main portions of the body which simulate as closely as possible the connections actually existent in the human body.

Referring more specifically to the construction illustrated in Figures 1 to 7, it will be observed that the same comprises main body parts, which, because of their specific shapes will be referred to for convenience as a skull or cranium 1, a thorax or rib cage 2 as well as a pelvis 3. Arms 4 are attached to the upper portion of the thorax, while legs 5, 5 are attached to the lower portion of the pelvis. The device shown in these figures is substantially a two dimensional construction so that the arms and legs are hinged to swing only in the plane of the device. As shown I provide eyelets 6, 6 for hinging the arms and eyelets 7, 7 for hinging the legs, but other suitable hinge devices may be employed as found desirable in actual manufacture. The arms likewise provide elbow joints hinged by eyelets 8, 8 and wrist joints hinged by eyelets 9, 9. The legs provide knee joints hinged by eyelets 10, 10.

Heretofore in construction of similar devices it has been customary to hinge the thorax and pelvis together at one point and the skull similarly has been hinged at one point to the thorax. However, for study of the human body and enabling a student to sketch the same in various attitudes, such hinging fails to give a normal position of the parts of the body with relation to each other except in the upright or aligned position of the parts. I have constructed an educational device providing an articulated attachment of the main parts 1, 2 and 3 of the body. In Figures 1, 2 and 3 I have shown the neck for the device constructed of several members hinged together so as to enable the head to be swung from side to side in a manner simulating the movement of the human head with respect to the thorax. In the construction shown, it will be oberved I provide a pair of neck members 11, 12, these members being hinged together as by eyelet 13 and one of the members as 11 being hinged to the head by eyelet 14 while the other member 12 is hinged to the thorax by eyelet 15. Hinging of the upper neck member 11 to the head is preferably considerably above the chin, and for purposes of enabling the device to be positioned in natural attitudes, I have hinged the upper neck member at the height of the nose of the figure. The head may therefore be swung about that point as a center and the neck may be given a curvature into attitudes which will be natural to a human being. The pivot joints are preferably made sufficiently tight so that the parts will remain in whatever position to which they are swung and thus enable the student to work from a figure which is at rest and in a natural position.

The thorax 2 and pelvis 3 are connected by spinal members the same being shown as providing members 16, 16 similar in construction and pivoted respectively to the thorax and pelvis and directed toward each other at the midway between the sides of the figure. Each of these members 16, 16 have suitable hinge means such as eyelets 17, 17 attaching the same pivotally to the body portions. The projecting ends of said spinal members 16, 16 are shown pivoted each to similar spinal members 18, 18 by eyelets 19, 19, and these members 18, 18 are pivoted to a common connecting member 20 by eyelets 21, 21. In this connection it may be noted that I have shaped the edges of the members forming the spinal column and position alternate members in common planes so that bending of the body or thorax with respect to the pelvis will be limited to that which an ordinary person could bend. The angle between the adjacent edges of alternate spinal members is made so that upon bending the body with respect to the pelvis said edges will meet and form a stop to prevent any further bending beyond a desired amount predetermined in the manufacture of the device. The figure so far described is one showing the body in face view and thus will demonstrate body positions from side to side.

In Figures 8 to 14 I have shown the device representing a human body in side elevation and in this view the relative positions of the parts of the body in various attitudes may be studied with respect to changes toward the front and back as distinguished from side to side movement. In these figures I have designated the head or skull by reference numeral 22, the thorax by reference numeral 23 and the pelvis by reference numeral 24. The arms 25 are hinged to the upper part of the thorax and legs 26 are hinged to the lower part of the pelvis. I have shown the hinging of the arms effected by an eyelet 27 passing through the upper ends of both arms and through the thorax. This construction supports both arms upon the same transverse axis. The arms are hinged at their elbows by suitable means such as eyelets 28 and the hands are hinged at the wrist by eyelets 29. Similarly, the legs are both hinged upon a common eyelet 30 to the pelvis 24. The knee joints are hinged by eyelets 31 and I have shown other eyelets 32 pivoting the feet at the ankles. I also provide a toe movement with respect to the foot by pivoting toes to the feet by eyelets 33.

The head is pivoted to the thorax by an articulated neck the neck being shown as made up of a plurality of overlapping members 34, the upper member 34 being hinged by eyelet 35 to the head at the back thereof about on a level with the nose, and said upper member having another lower eyelet 36 securing that member to the member next below, and so on, the lowermost member having an eyelet 37 pivoting the lowermost member to the thorax 23. By this arrangement the head is permitted to have a natural movement forward and backward. The eyelets or other hinging means are made tight enough to enable the parts to be swung to any desired angle and maintain that position until manually changed.

The thorax and pelvis in the construction now being described are likewise secured together by an articulated spinal member, the same being shown as made up of a plurality of members 38 the uppermost one of which is secured to the thorax by hinged means such as eyelet 39 and is secured to the next member 38 therebelow by an eyelet 40, this second member being likewise secured to a similar member by another eyelet 40 and so on, the last or lower member being secured to the pelvis by hinge means such as eyelet 41. I prefer to make the arrangement such that various natural positions of the thorax and spine may be obtained and to aid in accomplishing these attitudes I preferably pivot the upper member 38 of the spinal column at the rear of the thorax 23 and at a distance above the lower end thereof. The spinal column is composed of a sufficient number of members to enable the body parts to be bent into natural and desired positions maintaining the proper relationship of the parts at such time, and the hinging of the several parts together is such that they will maintain the position to which they are bent until manually changed.

It will be understood that it is not essential to picture the bone structure of the head, thorax and pelvis as illustrated in Figures 1 and 8 and it may in some cases be found undesirable to do so if it appears that the student's attention is diverted from the shape and relative proportions of these parts by the emphasis which such surface illumination and direction might entail.

I deem it within the scope of the invention to apply the same in connection with a three dimensional device, and in this connection call attention to Figures 15 to 26 inclusive illustrating such a device. In these figures I provide a head or skull 42, thorax 43 and pelvis 44 which simulate as near as possible the corresponding human parts. Both the thorax and pelvis may be formed as solids familiar to everyone. As shown both are partially egg-shaped, as at 43 and 44 respectively. In fact there may even be provided a removable section as shown in dotted lines at E in Fig. 15 which emphasizes the egg shape of the thorax. As shown in Fig. 16 the pelvis 44 also has the shape of part of an egg.

The device is provided with arms 45 and preferably the arms are jointed at the elbows 46 and again at the wrists 47. The elbow joint is shown as a hinge joint whereas the wrist joint is of the ball and socket type as may be also the elbow joint if desired. In order to attach the arms at the shoulders I have attached devices which may be referred to as shoulder blades 48 at the back of the thorax near the upper end thereof, one of said shoulder blades projecting outwardly from the thorax at one side and another one projecting from the thorax at the other side. These shoulder blades are shown as substantially triangular in shape and pivoted as at 49 near one side of thorax. In the front face of the shoulder blade which projects beyond the side of the thorax is provided a socket 50 for receiving the upper end of the arm. Preferably the end of the arm engaging said socket is of a ball formation and within the arm is a longitudinal coil spring 51 at the end of which passes out through the ball end of the arm and is engaged by suitable anchorage 52 secured in the shoulder blade (see Figure 21). The spring extends down through the elbow joint of the arm to the wrist joint, passing through the ball of that joint and the lower end of the spring is secured in the hand, as by pin 53. This construction therefore gives a tension in all of the joints of the arm so that they will remain in whatever position to which they are swung. At the front of the thorax, substantially at the upper end thereof, I mount what may be termed collar bones 54. As shown, I extend these collar bones to a position adjacent each other at the front of the thorax and employ separate pivots 55, 55 for the ends, but obviously this construction may be altered if found more desirable. Preferably the mounting of the collar bone to the thorax is pivotally accomplished as this permits that freedom of movement necessary to accommodate up and down movement of the shoulder blade as well as front and back movement thereof as will be referred to further as the description progresses. The outer ends of each of the collar bones 54 are attached to the respective shoulder blades at the outwardly projecting extremities thereof preferably just above the attachment of the arm thereto. Here the attachment need not have latitude of movement between the parts pivoting at this point being usually sufficient. Preferably the pivotal attachment of the shoulder blade to the thorax includes pivot 49, the inner end of which is attached to a spring 56 extending toward the front of the thorax and suitably anchored by hook or other holding means 57. It will be understood that suitable holes are made through the thorax from the back toward the front to contain said springs 56 and as a result of this construction the shoulder blade will normally be drawn toward the thorax and held in any position to which it is swung and this various shoulder movement may be exemplified by either swinging the shoulder blade up and down or toward the front or back, the play referred to above in the pivotal attachment of parts accommodating this forward and backward movement of the shoulder blade and the hole in the shoulder blade through which the pivot passes being oversize to permit movement in all directions although separation of the shoulder blade and thorax is not permitted.

The device also provides legs 58 having their upper ends of rounded or ball construction fitting into similar sockets in the pelvis and held therein by means of springs 59. These springs extend downwardly through the legs passing through hinged knee joints 60 and downwardly through the lower part of the leg through a ball and socket joint 61 at the ankle and anchored as at 62 to the bottom of the foot. The springs in each leg will therefore enable the same to be swung to any natural position and be retained in that position until manually changed.

The head is secured to the thorax by an articulated neck and the thorax is secured to the pelvis by an articulated spinal column. This construction is obtained by utilization of a plurality of neck members 63 each spherical in general shape and each provided with a concave socket to receive the spherical portion of the next adjacent member. The spinal column is likewise made up of a plurality of similar members 63, and therefore requires no separate description. The under side of the head at about the level of the nose is provided with a semi-spherical knob 64 which fits the concave socket of the upper neck member 63, and the upper end of the thorax is provided with a concave socket 65 (see Figure 20) to receive the lower spherical portion of the lower neck member. Similarly, the thorax is provided at the lower portion thereof at the back with a semi-spherical knob 66 which fits the concave socket of the upper spinal member 63 and the upper part of the pelvis is provided with a concave socket for receiving the lower end of the spinal column. I preferably provide a continuous hole all the way from the top of the head downwardly through the several neck members, through the thorax and through the spinal members into the pelvis. Preferably the pelvis is cut away from the front thereof to represent the bone structure, and the hole extends downwardly through the sloping upper and rear wall of the pelvis. A suitable anchorage means 67 is provided at the lower end of the hole in the pelvis for a spring 68 extending upwardly through the said hole and anchored at its upper end by suitable means such as hook 69 at the top of the head. The hook may also provide an exterior eye 70 by which the device can be hung up for demonstrative purposes. The structure is such and spring tension sufficient to enable the several parts to be posed in any desired natural attitude and retain that position until manually changed.

From the above it will be seen that I have constructed a device for instructing in the study of art as to the true proportions and relative positions of the essential parts of the human body and have made the essential parts of my device of geometric figures which simulate in relative proportions and basic outline the body portions of the human body and connect these parts with flexible members by which the figure as a whole is adapted to assume various natural positions and attitudes and retain the same in their proper natural relative positions with one another. In representing the parts of the human body, as shown in Figures 1, 8 and 15 herein, in geometric forms and basic outlines which do not take into account the fleshy portions of the body and which avoid employing the naked bony structure of a skeleton, students may be readily taught to visualize the relative positions of the major parts of the human body without the distracting influences of sketching from nude or skeleton models. Moreover, the main body parts of my device, being constructed of geometric figures which in a word depict less than a nude and more than a skeleton, serve to accentuate the relative positions of the corresponding parts in the human body because such figures in and of themselves subordinate all non-essential details.

It will be understood that while I have illustrated and described my invention as applied to the main body portions of the human body, the same is applicable to also depict such portions of the bodies of other members of the animal kingdom.

Obviously other detail changes and modifications may be made in the construction and use of my improved educational device, without departing from the spirit or scope of the invention and I do not wish to be understood as limiting myself to the exact construction shown or described except as set forth in the following claims when construed in the light of the prior art.

The term "modified geometric forms" as employed in the claims is intended to mean forms in which the basic or fundamental geometric figure or form is apparent, or is modified only to an extent such that the basic geometric form from which it is derived is readily discernible.

What is claimed is:—

1. An anatomical device for modeling, which comprises a plurality of main structural parts having the principal apparent constructional features of the corresponding anatomical portions of the human body and having detailed constructional features omitted, the said structural parts being associated in true proper proportion to each other and members flexibly connecting said structural parts to permit movement of the said parts of the device into various different postures and retain the device in each posture.

2. An anatomical device for modeling, which comprises a plurality of solid main structural parts having the principal apparent constructional features of the corresponding anatomical portions of the human body and having detailed constructional features omitted, the said structural parts being associated in true proper proportions to each other and members flexibly connecting said structural parts to permit movement of the said parts into various different postures and retain the device in each posture.

3. An anatomical device for modeling, which comprises a plurality of main structural parts having the principal apparent constructional features of the corresponding anatomical portions of a human body and having detailed constructional features omitted, said parts being of modified geometric solids simulating the corresponding anatomical parts, the said structural parts being associated in true proper proportions to each other and articulated members flexibly connecting said structural parts to permit movement of the said parts of the device into various different postures and to retain the device in each posture.

4. An anatomical device for modeling, which comprises a plurality of main structural parts composed of modified geometric forms having the principal structural features of the main anatomical portions of the body including a thorax of modified geometric form and a pelvis of modified geometric form, the said structural parts having detailed constructional features omitted and associated in true proper proportions to each other and members flexibly connecting said structural parts to permit movement of the said parts into various different postures and retain the device in each posture.

5. An anatomical device for modeling as specified in claim 4, including leg members independently hinged at opposite sides of the pelvis and arm members independently hinged at opposite sides of the thorax.

6. An anatomical device for modeling as specified in claim 4 in which the said structural parts comprise modified geometric solids simulating the head, thorax and pelvis, said head and thorax having an articulated neck portion interposed therebetween, the said thorax and pelvis having an articulate spine portion therebetween and a spring extending from the head through the thorax into the pelvis portion and holding the said parts together.

7. An anatomical device for modeling as specified in claim 4 including in combination shoulder blade elements of modified geometric form hinged to the said thorax, a simulated collar bone hinged at the front of the thorax and hinged to said shoulder blade elements, and an arm hinged to the shoulder blade elements adjacent the hinged connection between said shoulder blade elements and said simulated collar bone.

8. An anatomical device for modeling as specified in claim 1, including a modified ellipsoid simulating the thorax of the body and interconnected with other parts of the anatomical device to permit relative movement.

In testimony whereof I affix my signature.

EMILY GRACE HANKS.